G. W. ROBINSON.
Hand Corn-Planters.
No. 158,129.    Patented Dec. 22, 1874.
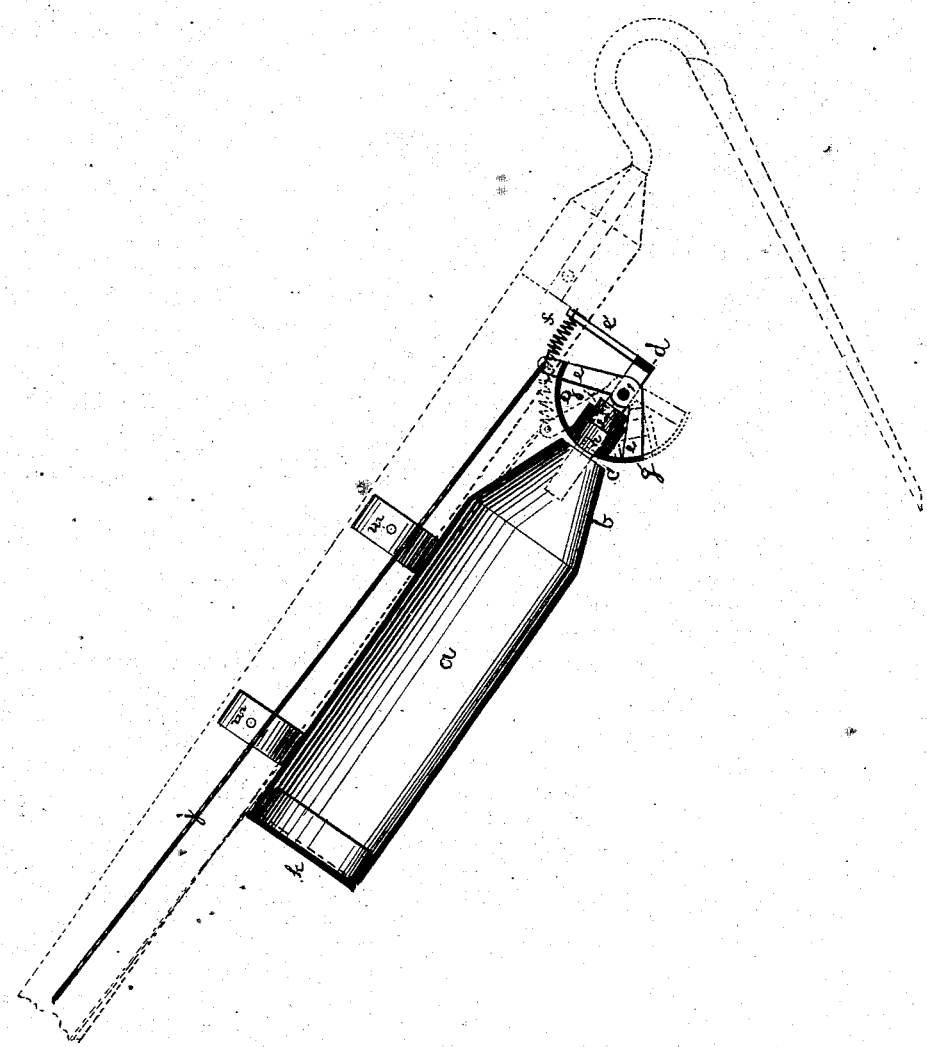
WITNESSES:
INVENTOR:
George W. Robinson

UNITED STATES PATENT OFFICE.

GEORGE W. ROBINSON, OF BENNINGTON CENTRE, VERMONT.

IMPROVEMENT IN HAND CORN-PLANTERS.

Specification forming part of Letters Patent No. 158,129, dated December 22, 1874; application filed December 16, 1874.

*To all whom it may concern:*

Be it known that I, GEORGE W. ROBINSON, of Bennington Centre, Bennington county and State of Vermont, have invented a new and useful Improvement in Hand Corn-Planters, of which the following is a description, reference being had to the accompanying drawing and letters thereon, which form part of this specification.

The figure in the drawing represents my planter, partly in section, as applied to an ordinary hoe-handle, the same being shown in dotted lines.

$a$ is a cylinder, having a contracted downward end, $b$, with an outlet at $c$. Rigidly attached to this cylinder, upon either side, is a frame, $d$, in which a tumbler, $e$, is pivoted at 1. This frame is provided with an arm, $e'$, to the upper end of which is secured a spring, $f$. One end of this spring is attached to the arm of the tumbler. The tumbler $e$ is composed of radiating arms, which support a plain curved plate, $g$, in which is a pocket, $h$, having an adjustable bottom, $i$. The depth of the pocket can be varied at will, for holding more or less corn, as may be desired, for each hill. When the tumbler is in its normal position, as shown in the drawing, the pocket $h$ is directly opposite the outlet $c$ in the cylinder or hopper $a$. When this tumbler is turned by the operator, by drawing upon the cord or wire $j$, the spring $f$ is overcome, and the tumbler assumes the position shown in dotted lines, which brings the mouth of the pocket below the outlet of the cylinder. When the operator releases the string $j$, the tumbler returns to its normal position, in consequence of the tension of the spring $f$. In the upper end of the cylinder or hopper is a stopper or cover, $k$, whereby corn may be fed to said hopper. $m$ $m$ are straps of tin or other material attached to the hopper, by which means my device may be secured to the hoe-handle in any convenient way.

The operation of my planter is as follows: The device, after being secured to any ordinary hoe, and being filled with corn through its upper end, is prepared for planting. The operator prepares the ground or hill for the reception of the corn, while the latter, by its gravity, has already fallen into and filled the pocket $h$ in the tumbler. Now, to drop the charge or contents of said pocket, the string is drawn, which turns the tumbler, bringing the plain face thereof above the pocket in front of the outlet $c$, thereby preventing further flow from the hopper until said tumbler is returned. The pocket, thus being brought below the outlet of the hopper, freely discharges the charge of corn by the gravity of the latter, when, by releasing the string, the tumbler resumes its usual position, with the pocket directly in front of the outlet $c$.

The device is made mostly of tin, but may be of other material.

The position of the tumbler in front of the contracted outlet results in great advantages over other planters.

My device is cheap, durable, simple in construction, and not liable to get out of order.

It will be evident that the construction can be considerably varied without departing from the spirit of my invention. The hopper may be made of any size desired, but usually I make them to hold about one pint of corn. Two of these planters may be used side by side, if desired, so as to plant at the same time both corn and beans. As the number of kernels of corn can be regulated from one upward, to suit taste, by adjusting the bottom of the pocket, this device therefore adapts itself to all emergencies, and the various tastes or notions as to the number of kernels of corn that a hill should require.

What I claim, and desire to secure by Letters Patent, is—

The combination of a hopper, $a$, having the contracted end $b$ and outlet $c$, with the oscillating tumbler $e$, situated in front of the contracted end of the hopper, and provided with a pocket, $h$, and plain surface $g$, all adapted for use upon an ordinary hoe, as described.

GEORGE W. ROBINSON.

Witnesses:
I. W. COLLAMER,
THOMAS C. CONNOLLY.